(12) United States Patent
Kobayashi et al.

(10) Patent No.: US 7,225,445 B1
(45) Date of Patent: May 29, 2007

(54) EXECUTION CONTROL APPARATUS WITH KEY PAD THAT ENABLES SELECTION OF JOBS TO BE RUN

(75) Inventors: Tetsuya Kobayashi, Kanagawa (JP); Kimitake Hasuike, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/389,299

(22) Filed: Sep. 2, 1999

(51) Int. Cl.
*G06F 9/46* (2006.01)
*B41B 1/00* (2006.01)
*B41J 1/00* (2006.01)

(52) U.S. Cl. ...................... 718/108; 358/1.9
(58) Field of Classification Search ............... 709/106, 709/107; 700/28, 83; 705/7; 29/593; 345/173; 348/584; 399/81, 83, 403, 82; 358/1; 718/106, 718/108
See application file for complete search history.

(56) References Cited

U.S. PATENT DOCUMENTS

| | | | | |
|---|---|---|---|---|
| 4,961,092 A | * | 10/1990 | Rabb et al. .................. 399/403 |
| 5,227,816 A | * | 7/1993 | Forest ......................... 347/153 |
| 5,669,040 A | * | 9/1997 | Hisatake ....................... 399/83 |
| 5,742,824 A | * | 4/1998 | Kosaka ........................ 700/245 |
| 5,774,356 A | * | 6/1998 | Hisatake et al. .............. 700/28 |
| 5,781,248 A | * | 7/1998 | Chida .......................... 348/584 |
| 5,907,410 A | * | 5/1999 | Ohtake ........................ 358/468 |
| 5,917,912 A | * | 6/1999 | Ginter et al. ................. 705/40 |
| 5,983,051 A | * | 11/1999 | Mishima et al. .............. 399/83 |
| 5,999,911 A | * | 12/1999 | Berg et al. .................... 705/7 |
| 6,088,024 A | * | 7/2000 | Yamagata .................... 345/173 |
| 6,167,209 A | * | 12/2000 | Suzuki et al. ................. 399/8 |
| 6,213,652 B1 | * | 4/2001 | Suzuki et al. ............... 358/1.15 |
| 6,223,091 B1 | * | 4/2001 | Powell ......................... 29/593 |
| 6,434,343 B1 | * | 8/2002 | Kobayashi et al. ............ 399/8 |
| 6,606,163 B1 | | 8/2003 | Suzuki et al. .............. 358/1.15 |
| 2004/0008363 A1 | | 1/2004 | Suzuki et al. ................ 358/1.5 |

FOREIGN PATENT DOCUMENTS

| | | |
|---|---|---|
| EP | 0 738957 | 10/1995 |
| JP | 62-269239 | 11/1987 |
| JP | 06-237348 | 8/1994 |
| JP | 07-234768 | 9/1995 |

(Continued)

*Primary Examiner*—Ayaz Sheikh
*Assistant Examiner*—Christian LaForgia
(74) *Attorney, Agent, or Firm*—Finnegan, Henderson, Farabow, Garrett & Dunner, L.L.P.

(57) ABSTRACT

Various settings are stored into a setting storage table for stop-key processing. These settings are related to a job kind where an operation is stopped by manipulating a stop key, a job kind where an operation is made to pause, and a job kind where an operation is continued without any interruption. When the stop key is manipulated, the job set to the stop operation is directly stopped, and the job set to the execution continuation is continuously executed. The jobs set to the pausing operations are displayed in a list. These jobs are selected one by one, or in a batch mode. Thereafter, either the stop operation or the restart operation is instructed. Accordingly, even under such an environment that a plurality of jobs are executed in a parallel manner; a desirable job can be quickly stopped, and moreover, lowering of throughputs of other jobs can be suppressed.

18 Claims, 21 Drawing Sheets

FOREIGN PATENT DOCUMENTS

| | | |
|---|---|---|
| JP | A-HEI. 7-303163 | 11/1995 |
| JP | 8-6745 | 1/1996 |
| JP | 08-006745 | 1/1996 |
| JP | A-HEI. 8-286895 | 11/1996 |
| JP | A-HEI. 9-212325 | 8/1997 |

* cited by examiner

| JOB ID | RELATED FILE NUMBER | JOB KIND | PARAMETERS FOR PROCESSING JOBS |
|---|---|---|---|
| 2 | 24 | COPY | SIZE: A4, NUMBER: 10, PRINT MODE: ONE SIDE TO BOTH SIDES |
| 3 | 89 | STORAGE | DESTINATION: MAILBOX 001, SIZE: A4 |
| 5 | 32 | NETWORK TRANSMISSION | NAME: FUNCTION SPECIFICATION, PAGE: 1/5 |
| 21 | 106 | NETWORK RECEPTION | HOST/USER NAME: HASUIKE: KLEE, PAGE: 1/5 |
| ... | | | ... |

*FIG. 3*

| JOB KIND | STOP-KEY PROCESSING |
|---|---|
| STORAGE | PAUSE |
| COPY | PAUSE |
| PRINT OUT | STOP (DELETE) |
| NETWORK TRANSMISSION | NO ACTION |
| NETWORK RECEPTION | PAUSE |

*FIG. 4*

EXECUTION CONTROL APPARATUS WITH KEY PAD THAT ENABLES SELECTION OF JOBS TO BE RUN

BACKGROUND OF THE INVENTION

The present invention is related to a job execution control apparatus suitable for a document processing apparatus having a plurality of functions such as copying, printing, faxing, and image filing. More specifically, the present invention is directed to a technique for stopping plural process operations executed in a parallel manner in response to an instruction from a user.

Recently, document processing apparatuses having a plurality of functions such as a digital copying machine, a printer, a facsimile, and an image filing apparatus (will also be referred to as a "hybrid machine" hereinafter) have been proposed. More specifically, in recent hybrid machines, while environments under which a plurality of jobs can be executed in a parallel manner are provided, such plural jobs are executed at the same time, for instance, a document is stored during a document printing operation, and communication is established between the hybrid machines and an external appliance during the document printing operation.

On the other hand, normally, such a hybrid machine includes an operation function so as to stop a job. For example, in Japanese Patent Publication No. 8 6745A, there is proposed such a system that all jobs are once caused to pause, and thereafter one job is selected to be canceled, and subsequently the remaining jobs are automatically restarted. Since this system may make all of these jobs pause at once, a job is conveniently stopped. However, in this system, since all of the jobs are at once brought into pausing states, such a job which must not be made to pause (for example, facsimile receiving operations) is also made to pause, resulting in a serious problem. Also, in an apparatus capable of executing a plurality of jobs at the same time, such a job that does not require a pausing operation would be brought into the pausing operation. As a result, overall productivity of the document processing apparatus would be lowered. Also, in this system, since only one job is canceled by a series of operations such as a pausing operation and a canceling operation, a user is required to execute the same operation several times so as to make a plurality of jobs pause. Accordingly, in order to solve such a problem, when a user requests to stop a job, the following method may be performed. For instance, during the simultaneous operations of these plural jobs, in order to confirm the job conditions are not made to pause, these jobs are displayed. A job to be stopped is selected from the displayed jobs, and a stop key is depressed with respect to the selected job to stop it. In accordance with this method, such a job which is not wanted, or is not required to be made to pause, is no longer brought into a pausing operation. However, in this system, the jobs are executed without any limitation for a time period during which a list of the jobs under execution is displayed, and a job which is required to be stopped is selected from the plural displayed jobs, and then this selected job is stopped. As a result, even when there is such a job which is required to be urgently stopped, this job cannot be stopped. Consequently, even when stopping a job under printing operation is desired, an ejection of paper cannot be avoided.

SUMMARY OF THE INVENTION

The present invention has been made to solve the above-described problems, and therefore, has an object to provide a job execution control apparatus capable of easily making a job pause, and furthermore, which does not unnecessarily lower the throughput of jobs.

It should be noted that in the following description, a document processing apparatus involves not only a stand-alone type document processing apparatus, but also such a document processing apparatus realized under a network environment in which at least portions of structural elements are distributed on the network. As portions of these structural elements, the following resources may be employed. That is, in one resource, a personal computer, a workstation, and an intelligent terminal are distributed on a network. Also, in another resource, a personal computer, a workstation, and an intelligent terminal are connected via a cable to a main body of a document processing apparatus.

In order to achieve the above objective, according to the present invention, there is provided a job execution control apparatus capable of executing a plurality of jobs in a parallel manner, comprising: means for setting a condition of a job which is directed to a pausing job; means for executing a job satisfying the condition pause in response to a predetermined event; means for displaying the pausing job; and means for specifying at least one job among the displayed jobs.

With employment of this configuration, since only the job that is directed to the pausing job is made to pause, this may solve the problem that the job is unnecessarily made to pause.

The job execution control apparatus may further comprise means for stopping the specified job. In this case, since the pausing job is selected to be stopped, the job stopping process operation can be quickly performed.

The job execution control apparatus may further comprise means for restarting the specified job.

The condition of the job which is directed to the pausing job may be specified by a kind of the job, or a parameter of the job.

The pausing job displaying means may display only the pausing job, or also jobs other than the pausing job.

The predetermined event may be an instruction input operation of a user, or other events. For example, the present event may be made by remote control. The above-described instruction input operation may be carried out by manipulating a predetermined key.

The job execution control apparatus may further comprise means for setting an additional condition under which the job pauses in addition to the condition set by the condition setting means. The additional condition may be defined as to whether the job corresponds to a background job, or a foreground job.

According to the present invention, there is also provided a job execution control apparatus comprising: means for storing a first condition satisfied by a job which is stopped without any restriction in response to a predetermined event and a second condition satisfied by a job which pauses in response to the predetermined event; means for stopping the job satisfying the first condition in response to the predetermined event; means for making the job satisfying the second condition pause in response to the predetermined event; means for displaying at least the pausing job; and means for designating at least one job from the displayed jobs to stop, or restart the designated job.

With this configuration, an effect similar to the above-explained effect can be achieved. Moreover, since the first condition under which the job is stopped without any restriction is previously determined, a desirable stopping process operation can be more quickly carried out.

According to the present invention, there is also provided a job execution control apparatus comprising: means for setting a condition satisfied by such a job which is stopped without any restriction in response to a predetermined event; and means for stopping the job which satisfies the set condition in response to the predetermined event.

Also with this configuration, since the first condition under which the job is stopped without any restriction is previously determined, a desirable stopping process operation can be more quickly carried out.

According to the present invention, there is also provided a job execution control apparatus capable of executing a plurality of jobs in a parallel manner, comprising: display means provided with a touch panel function, for displaying information related to one job; means for displaying a button for instructing a stop of the one job on the display means; means for stopping the one job when a touch operation is carried out with respect to the displayed button; a predetermined key provided on a portion except for the display means; means for storing a condition of a job which is directed to a pausing job; and means for making the job which satisfies the condition pause when the predetermined key is operated.

In this configuration, since the means for stopping the job displayed on the display means is provided independent from the general-purpose key used to stop the job, the job can be stopped without lowering the throughput similar to the above-described apparatus. Also, a desirable job can be immediately stopped.

According to the present invention, there is also provided a job execution control apparatus comprising: means for storing a condition of a job which is directed to a pausing job; means for making the stored job pause in response to a predetermined event; means for displaying the pausing job; and means for specifying at least one job among the displayed jobs.

Also in this configuration, similar to the above case, since only the job that is directed to the pausing job is made to pause, this may solve the problem that the job is unnecessarily made to pause.

According to the present invention, there is also provided a job execution control apparatus comprising: means for storing an attribute of a job which is directed to a pausing job; means for making a job having the stored attribute pause in response to a predetermined event; means for displaying the pausing job; and means for stopping at least one job among the displayed jobs.

With this configuration, the pausing process operation is selectively performed based upon not only the kind of jobs, but also various attributes of jobs (for example, processing amount, and cost). As a consequence, similar to the above-described manner, the job can be stopped without lowering the throughput, and moreover, the desirable job can be quickly stopped.

According to the present invention, there is also provided a job execution control apparatus comprising: means for storing a condition of a job which is directed to a pausing job; means for making the stored job pause in response to a predetermined event; means for notifying at least an identifier of the pausing job to an instruction apparatus; and means for stopping at least one job instructed by the instruction apparatus among the pausing jobs. In this case, the instruction apparatus may be realized as a computer system such as a personal computer and a workstation, which is connected to a main body of a job execution control apparatus via either a network (LAN, WAN) or a cable.

Also with this configuration, similar to the above-described manner, the job can be stopped without lowering the throughput, and moreover, the desirable job can be quickly stopped.

BRIEF DESCRIPTION OF THE DRAWINGS

In the accompanying drawings:

FIG. 3 is an example of a job management table of the embodiment;

FIG. 4 is a diagram for indicating a content of a setting storage table for a stop-key processing of the embodiment;

DETAILED DESCRIPTION OF THE PREFERRED EMBODIMENTS

Now, an embodiment of the present invention will be described.

Figure 1:
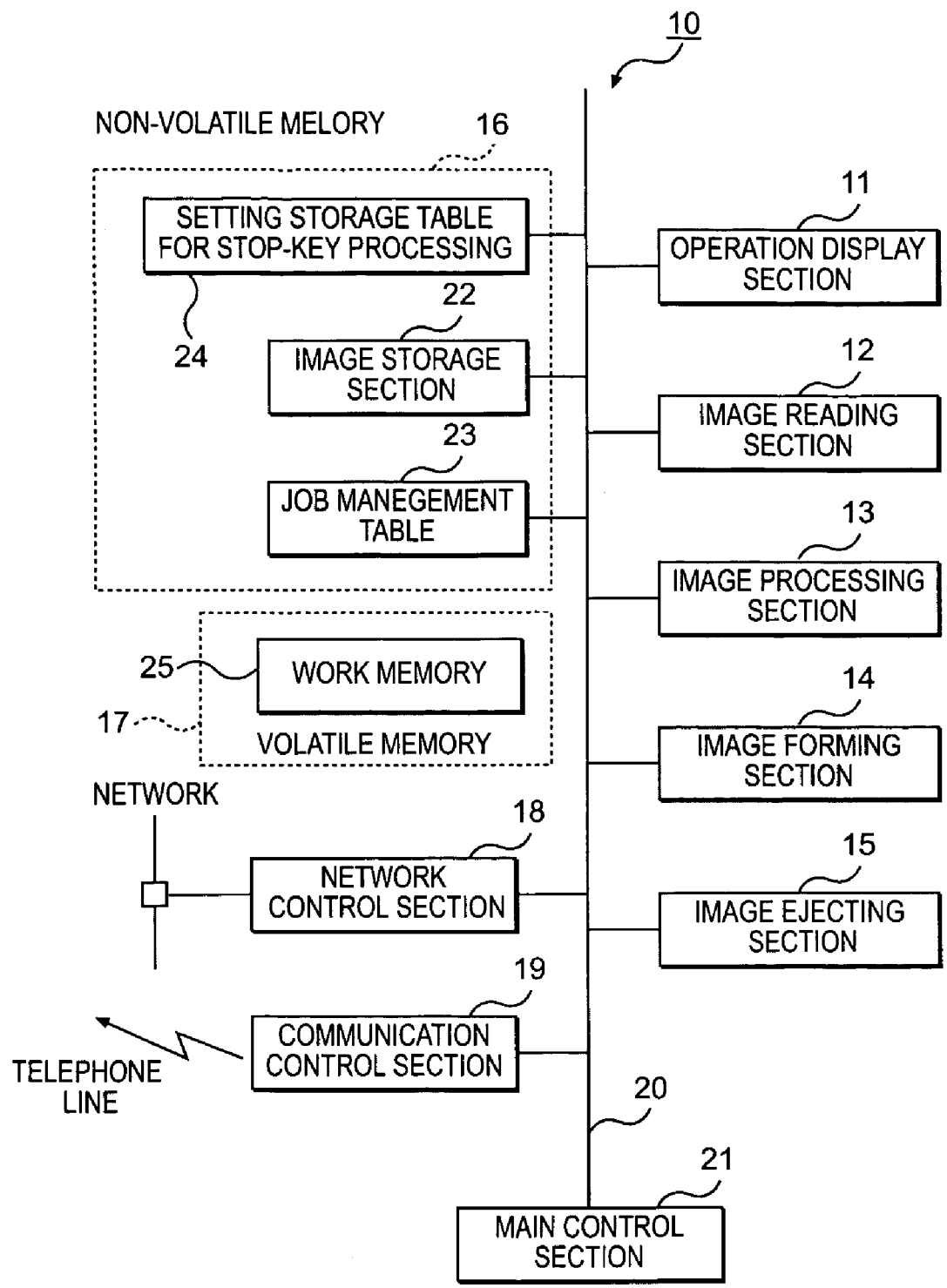
FIG. 1 is a block diagram for showing an overall configuration of an embodiment according to the present invention.

FIG. 1 indicates an overall configuration of a document processing apparatus 10 according to the present invention. In this drawing, an operation display section 11, an image reading section 12, an image processing section 13, an image forming section 14, an image ejecting section 15, a non-volatile memory 16, a volatile memory 17, a network control section 18, and a communication control section 19 are connected to a bus 20. Also, a main control section 21 is connected to the bus 20. The respective structural sections are controlled by this main control section 21. The non-volatile memory 16 constitutes an image storage section 22, a job management table 23, and a setting storage table for stop-key processing 24. On the other hand, the volatile memory 17 constitutes a work memory 25.

The operation display section 11 accepts an input operation made by a user, and also displays various data. The image reading section 12 optically scans an original to produce data about an electronic image. The image storage section 22 stores therein image data which is required to be processed. The image processing section 13 performs synthesizing and converting of an image. The image forming section 14 forms a hard copy from image data by using, for example, an electrostatic recording technique (known as xerography technique). The image ejecting section 15 guides a hard copy formed by the image forming section 14 to a tray and the like so as to eject this hard copy. A sorting function may be added to this image ejecting section 15, if required.

The network control section 18 is used to connect with a network. The communication control section 19 is used to connect with a telephone line.

It should also be noted that in the configuration of FIG. 1, the respective structural portions of the document processing section 10 are electrically mounted to a stand-alone type apparatus. Alternatively, either a portion or all of these structural portions are distributed to a network so as to be arranged on this network, so that a document processing system may be realized. For instance, the operation display section 11 may be electrically mounted on a network, or may be electrically realized by employing a computer system such as a personal computer arranged to be connected thereto via a cable. In this case, data may be transferred/received via either the network or the cable between the computer system and the main body of the document processing apparatus. The computer system issues an instruction to the main body of the document processing apparatus by using an identifier of a job, for example, a job ID (see FIG. 3) allocated to job information (will be discussed later).

This document processing apparatus 10 is so designed as to execute four kinds of jobs, namely 1) a copying machine, 2) a printer, 3) a scanner, and 4) a facsimile.

Copying corresponds to an operation for optically reading an original to form a duplication of this optically read original, namely a well-known process operation. Printing corresponds to an operation for printing out document data transmitted via a network. Faxing corresponds to an operation for printing out facsimile data transmitted via a telephone line, and also for transmitting predetermined image data as facsimile data via a telephone line to an external device.

Scanning corresponds to an operation for optically reading an original to produce image data and for saving this image data in a file (also will be referred to as a "scan-to-file", or a "document storage"). A file is stored into a predetermined storage location of the main body of the document processing apparatus (scan-to-mailbox), or is stored into an externally-provided computer (scan-to-server). A job template may be used to designate such that a file is stored into which externally-provided computer. In the former case, the file stored in the main body of the document processing apparatus may be accessed by a user. In the later case, another user of the externally-provided computer may access this externally-provided computer so as to utilize the file.

Figure 2:
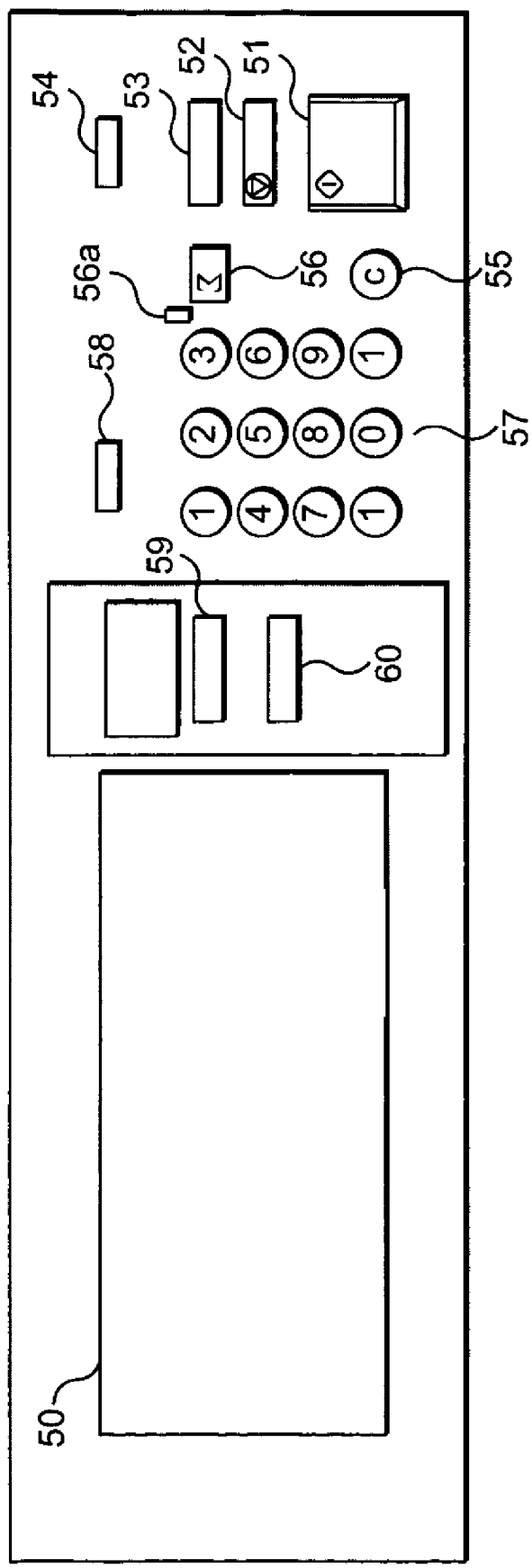
FIG. 2 shows an outlook of an operation display section of the embodiment.

FIG. 2 indicates an outlook of the operation display section 11.

In FIG. 2, various kinds of buttons and the like are provided on a right side of a front surface of the operation display section 11. A liquid crystal display 50 equipped with a touch panel function is mainly provided on a left side of this front surface.

As the buttons, there are provided a start button 51, a stop button 52, a reset button 53, a power save button 54, a clear button 55, and an interrupt button 56, a ten/symbol key button 57, a specification setting button 58, a job confirmation button 59, a menu button 60, and the like.

A start button 51 is used to start a job instructed by a user. The stop button 52 is used to stop a job, and especially, may play an important role in this embodiment. The reset button 53 is employed to reset all of set values within a mode so as to return these set values to default values. The power save button 54 is used to switch the document processing apparatus to the power save mode, or to return the document processing apparatus from the power save mode. The clear button 55 is employed to cancel an input value in a numeric-input mode. The interrupt button 56 is used to execute an interrupt job, or return the interrupt job to the job executed immediately before. An interrupt state is displayed by a light emitting diode 56*a*. The ten/symbol key button 57 is employed to enter a numeric value. For example, a telephone number, the copy number per one manuscript, or the like. "#" and "*" buttons are employed for dialing in a communication using the telephone line. The specification setting button 58 is used to enter a configuration setting screen to set a configuration of the document processing apparatus or to exit therefrom. Similar to the above-described stop button 52, the specification setting button 58 especially may play an important role in this embodiment. The relevant operations of the specification setting button 58 will be described in detail. The job confirmation button 59 is used to display a job condition confirmation screen on the liquid crystal display 50. The menu button 60 is employed to display a menu screen on the liquid crystal display 50.

A user depresses the menu button 60 to display the menu screen, and sets a job kind and a job parameter by employing this menu screen and the ten key button 57. Thereafter, the user depresses the start key 51 so as to instruct the document processing apparatus to execute the job. As to the instructed job, job information is produced, and this job information is saved in the job management table 23. For instance, as indicated in FIG. 3, the job management table 23 contains a job ID, a relevant file number, a job kind, and various kinds of job parameters with respect to each of these jobs. The job managing method is similar to the conventional job managing method, and therefore, a detailed description thereof is omitted.

FIG. 4 represents a content of the setting storage table for stop-key processing 24 of FIG. 1. This storage table content defines which process operation is carried out when the stop key 52 is depressed with respect to each of the job kinds. In this example, when the stop key 52 is depressed, the document storage job, the copy job, and the net reception job are caused to pause, the net transmission is maintained under the present state, and the document print job is stopped. Although a facsimile transmission and a facsimile reception are not indicated in this drawing, a similar definition may be made. Alternatively, as to the facsimile transmission/reception, while the user is not apparently allowed to change the configurations, no facsimile transmission/reception may be set in the setting storage table for stop-key processing 24.

Also, in the example of FIG. 4, the process operations (namely, pausing, stopping, and no action) when the stop key is operation every job kind. Alternatively, in summary, the respective process operations may be made in correspondence with the conditions used to execute the respective process operations. As previously explained, this condition may be defined by the job kind, and otherwise may be defined by other attributes of the jobs, for example, job parameters. Also, while a processing amount, cost, and processing time are calculated based upon the job parameter, these calculation results may be compared with a predetermined threshold value so as to select the corresponding process operations. When the print job is selected, while using the number of executed pages and the number of unexecuted pages as the parameter, this print job may be selected from pausing, stopping and continuing.

Also, in the example of FIG. 4, three different kinds of processing operations, namely "pause", "stop", and "no action" have been employed. Alternatively, only two kinds of processing operations such as "stop" and "no action" may be employed.

Next, a description will now be made of setting operations for the setting storage table for stop-key processing 24 shown in FIG. 4.

Figure 5A:
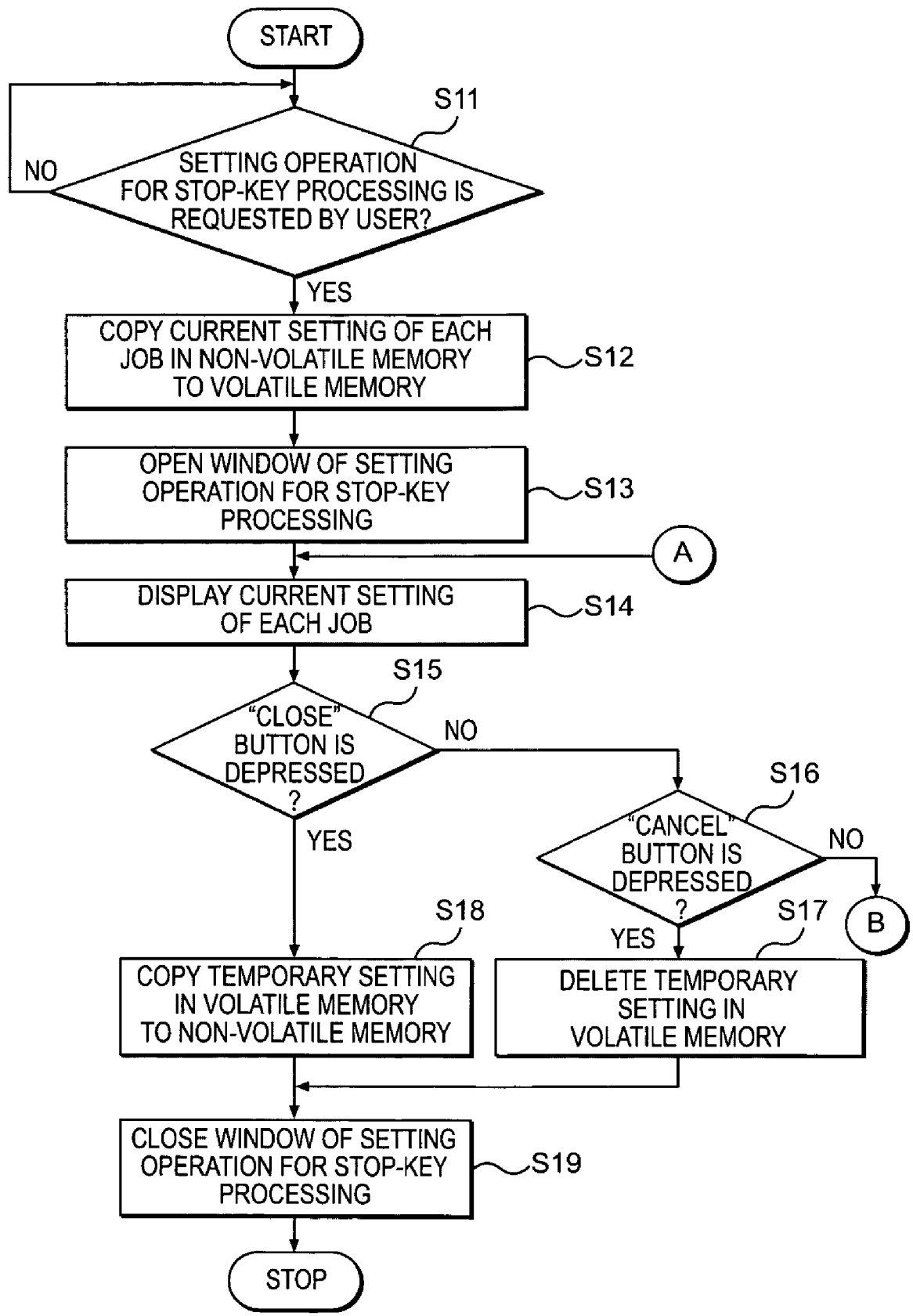
FIGS. 5A and 5B show a flow chart for describing a setting operation of the stop-key processing.
Figure 5B:
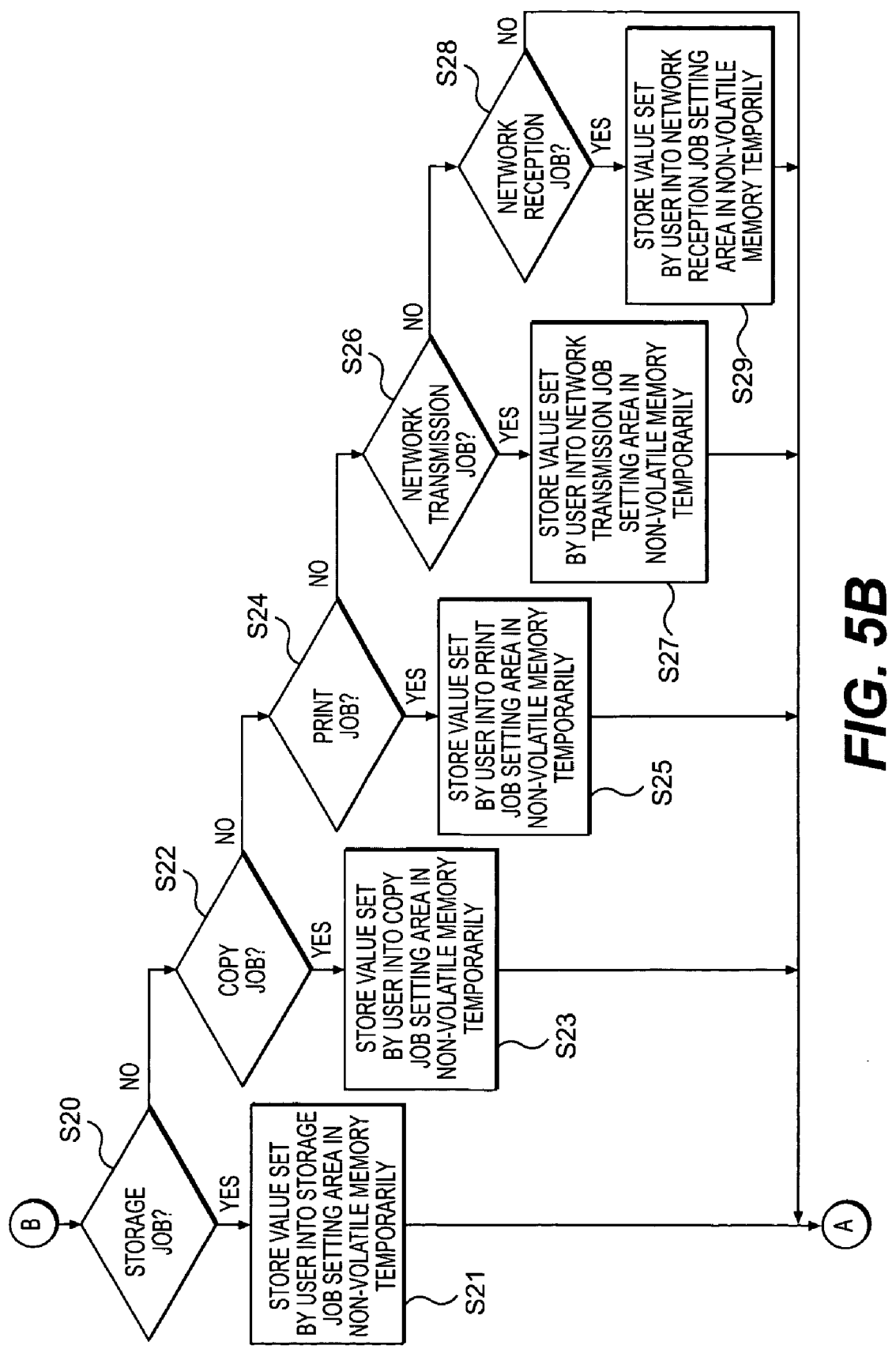

Setting of the setting storage table for stop-key processing 24 may be carried out by manipulating the specification setting button 58 of FIG. 2. Next, a setting operation for the stop-key processing will be explained. FIGS. 5A and 5B indicate the setting operation for the stop-key processing. In these drawings, when a user requests a setting operation for a stop-key processing (S 11), process operations after a step S12 are carried out. The request is attained by, for example, depressing the specification setting button 58 to display a specification setting menu on the liquid crystal display 50, and then selecting an entry to the setting operation.

First, the present content of the setting storage table for stop-key processing 24 of the non-volatile memory 16 is copied to the work memory 25 so as to prepare the setting operation (S12). Also, a setting window (see FIG. 7) is opened to display therein the present set value (S13 and S14). Thereafter, in response to an operation by the user, actions are set with respect to the document storage job, the copy job, the document print job, the network transmission job, and the network reception job (S20 to S29 of FIG. 5B). The current settings are displayed in the window (S14). When these settings are desirable, the user manipulates a "close" button (S15). In response to the manipulation of this "close" button, the set value of the work memory 25 is stored into the setting storage table for stop-key processing 24 of the non-volatile memory 16, and at the same time, the setting window is closed (S18 and S19).

To the contrary, when the setting is not desirable, the user manipulates a "cancel" button. In response to the manipulation of the cancel button, such a setting which has been temporarily stored in the storage area corresponding to the work memory 35 is deleted, and the setting window is closed (S16, S17 and S19).

Figure 7:
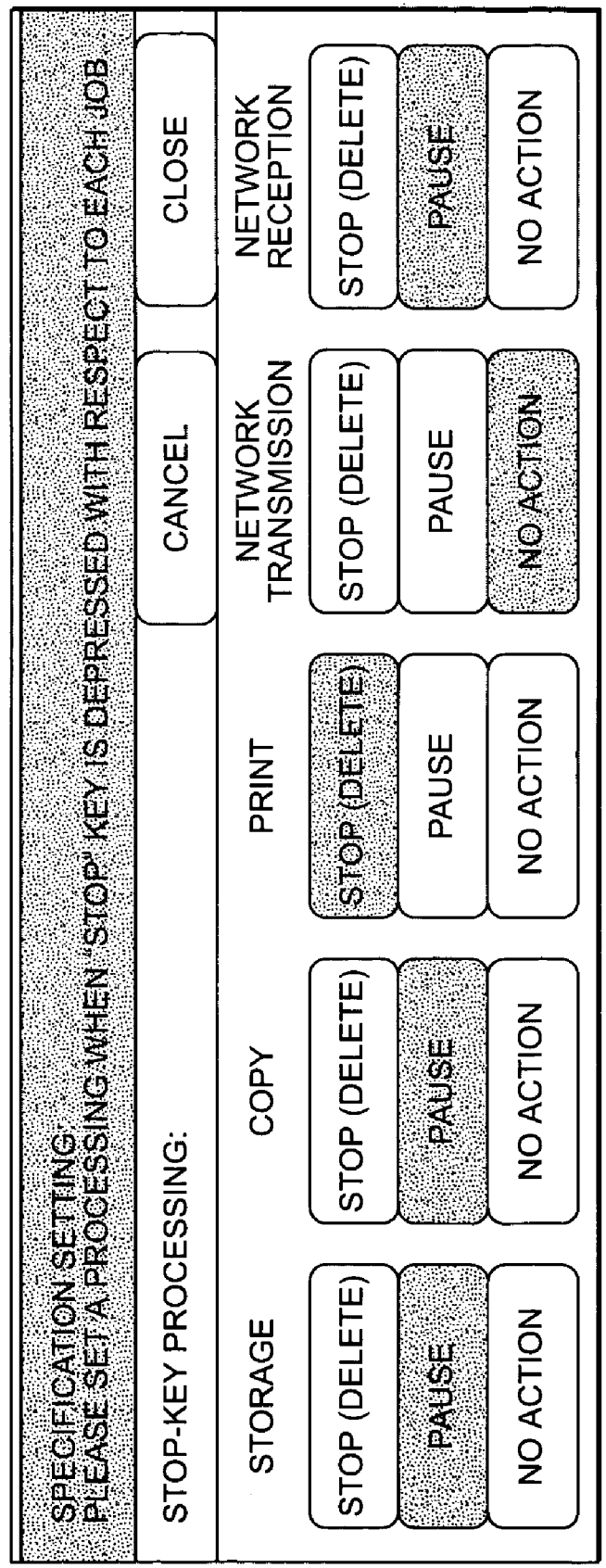
FIG. 7 is a schematic diagram for mainly describing an operation when the stop-key is depressed.

FIG. 7 schematically shows the above setting operations. In the beginning, the settings of the stop-key processing are indicated as those of FIG. 7. In this example, a "stop (delete)" button, a "pause" button, and a "no-operation" button are provided in an array with respect to each of the job kinds, and the set values are displayed in the invert mode. For instance, it can be seen that the "pause" button is displayed in the invert mode in the document storage job, and the "pause" operation is set. The user may make a selection by manipulating the set value button as desired. The selection is conducted exclusively and thus the selected button is turned to the invert mode. When the selected setting is made coincident with the desirable one, the user manipulates the "close" button so as to close the setting window, so that the setting process operation is accomplished. When the user does not want to make the setting effective, the user manipulates the "cancel" button to accomplish the setting operation.

Figure 8A:
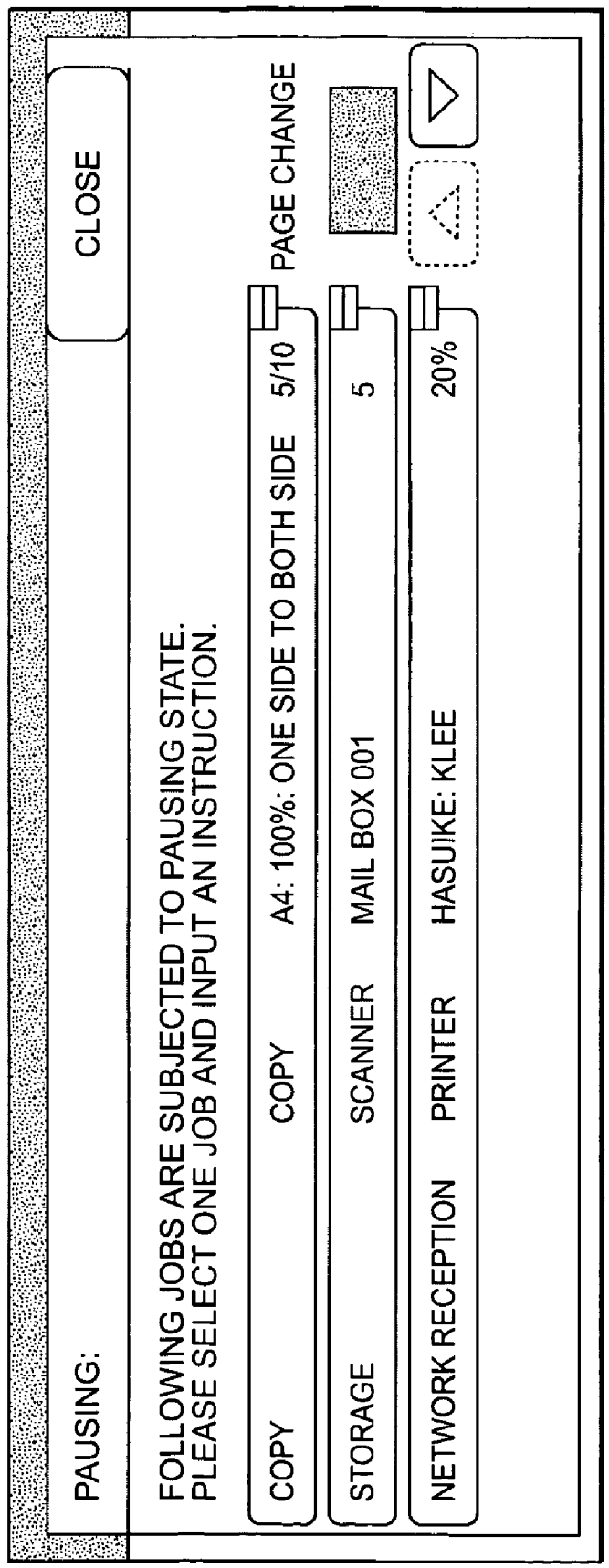
FIGS. 8A to 8C is a schematic diagram for explaining an operation executed for a list of pausing jobs.
Figure 8B:
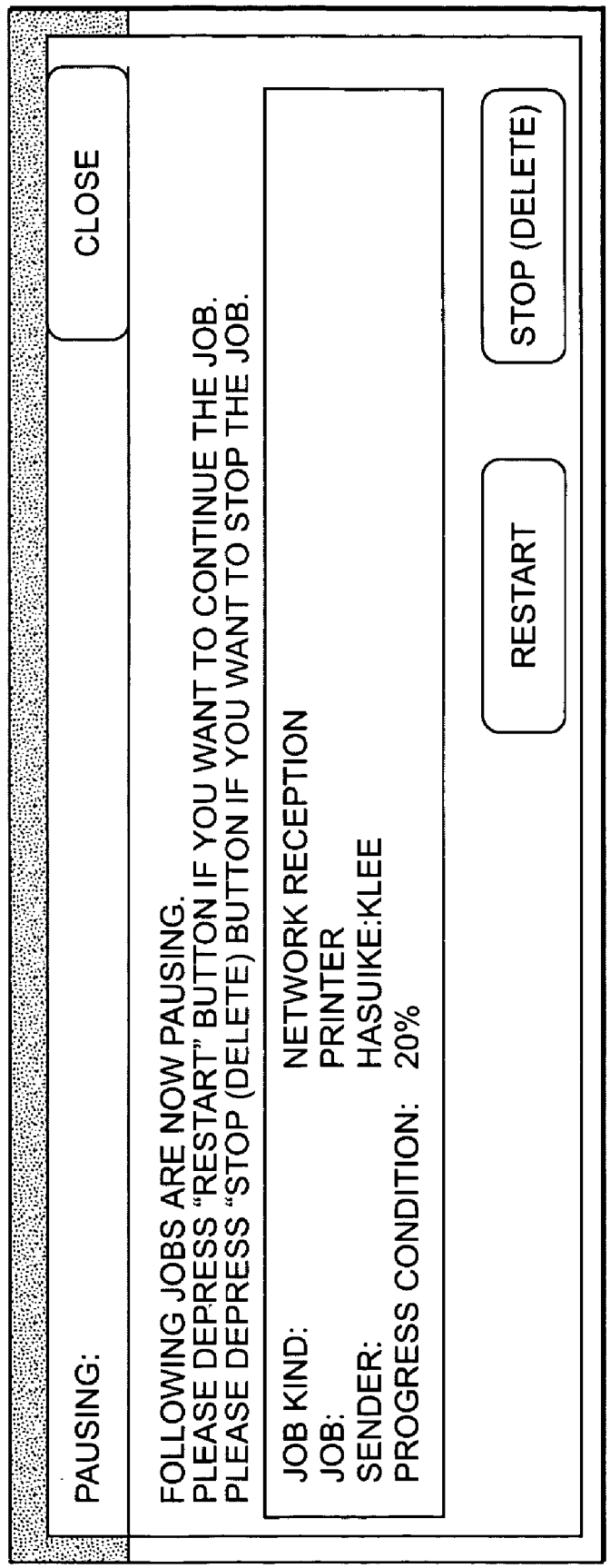
Figure 8C:
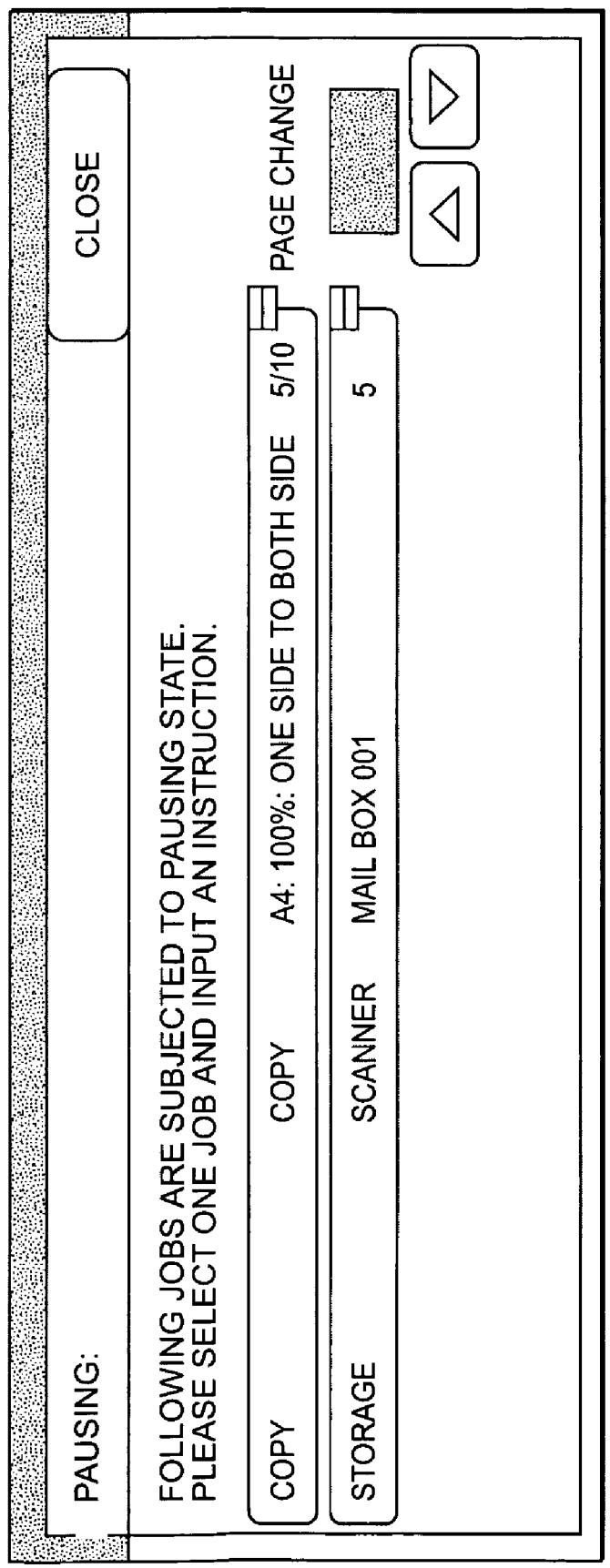

Next, a description will be made of process operations executed when the stop key 52 is depressed. FIGS. 6A to 6D show a flow chart for describing process operations when the stop key 52 is depressed. FIGS. 8A to 8C schematically indicate operations of this key manipulation.

Figure 6A:
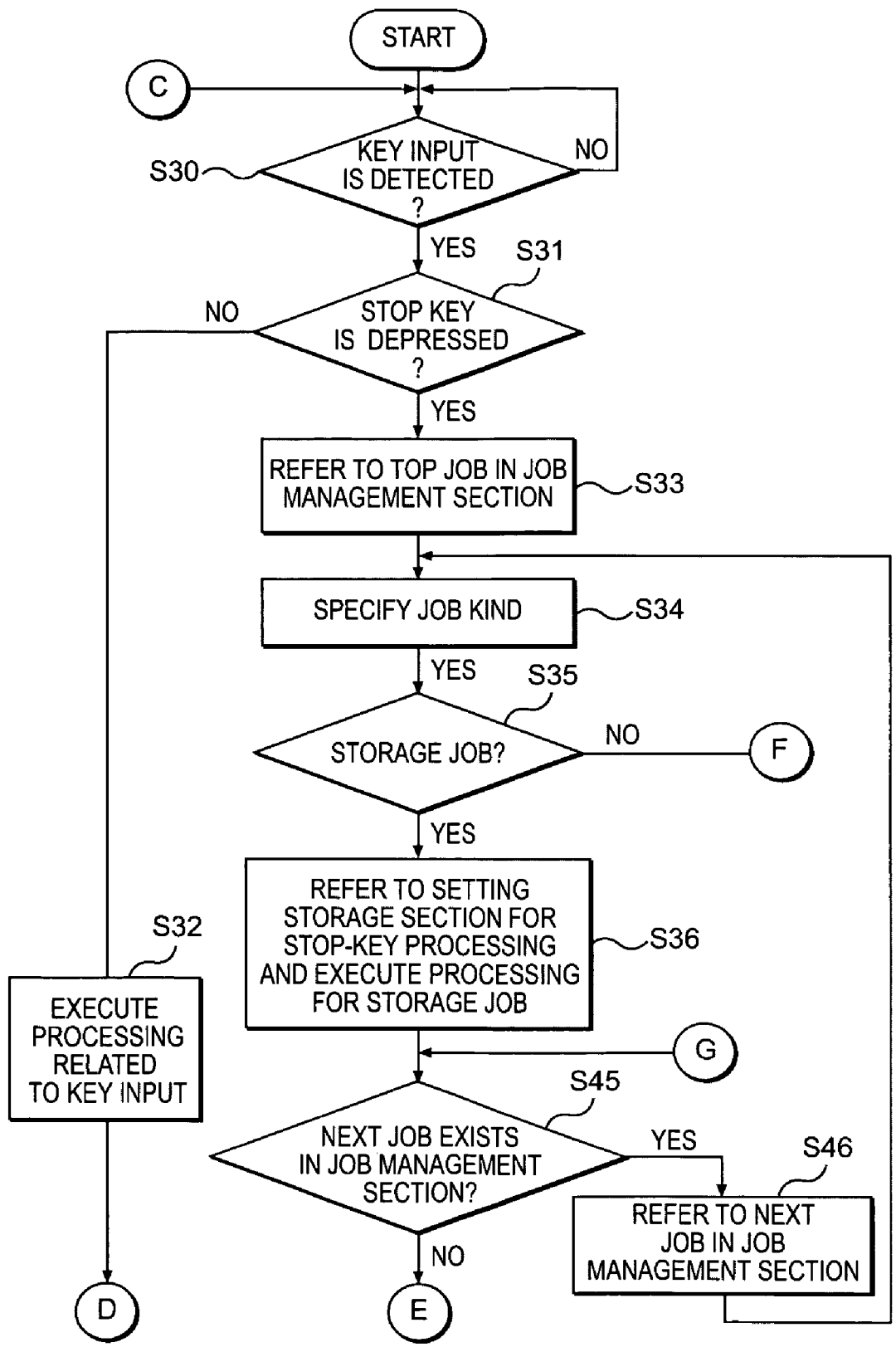
FIGS. 6A to 6D are a flow chart for mainly describing an operation when the stop-key is depressed.
Figure 6B:
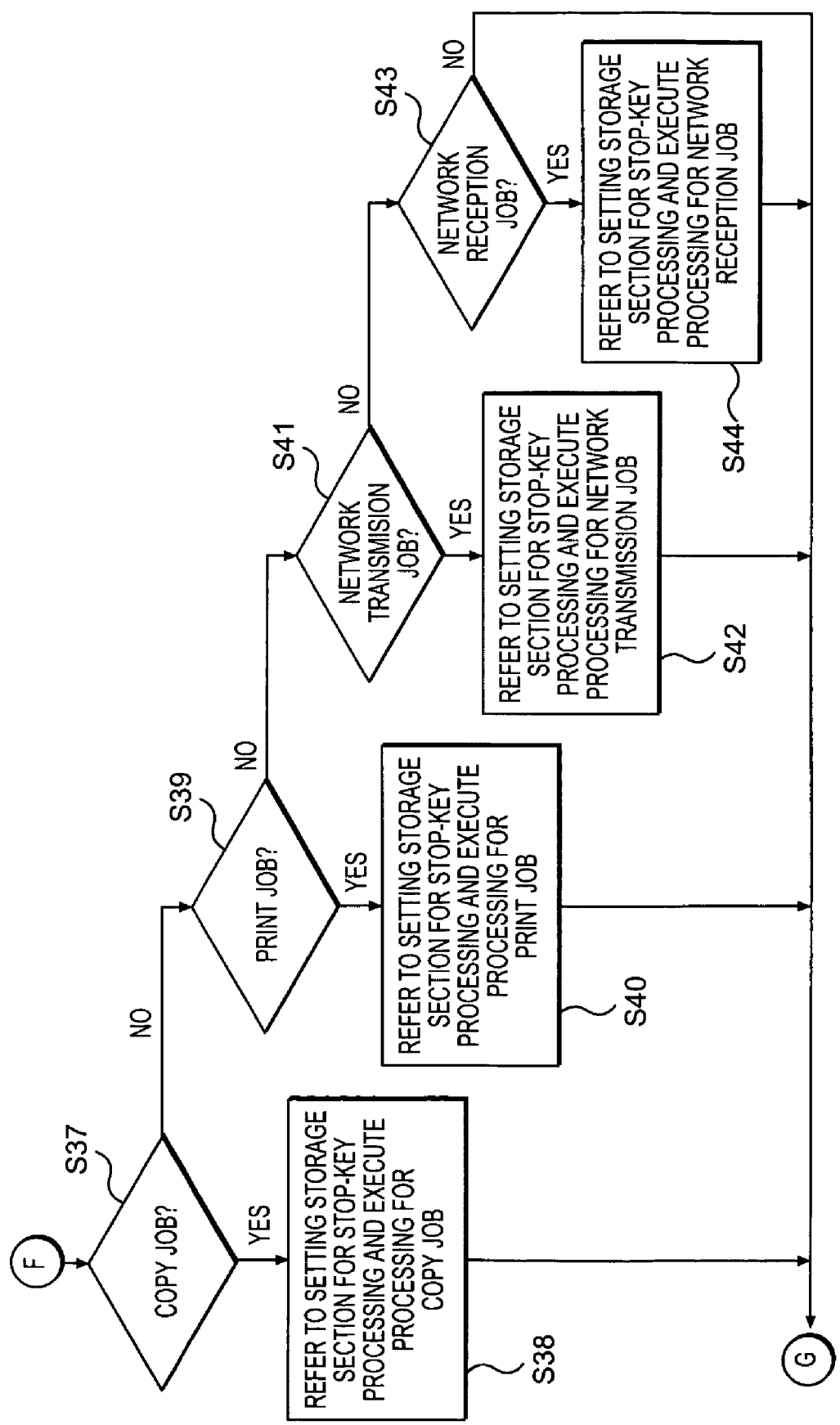

In FIGS. 6A and 6B, when any one of the keys is depressed, the key operation is detected and an operation corresponding to this key operation is executed (S31 and S32). The process operation executed when the stop key is manipulated will now be explained in detail. When the manipulation of the stop key is detected, a top job information in a job management section is referenced (S31 and S33). Then, process operations related to this job are carried out at steps S34 to S44. In process operations defined after steps S34 to S44, the job information of the job management section is sequentially applied until the last job information (S45 and S46). In the event that the subject job is the document storage job at steps S34 and S35, the preset process operation is carried out. In this case, the pausing operation is carried out (FIG. 4). It should be understood that this pausing operation will be discussed later in detail with reference to FIGS. 6C and 6D. Similarly, when the subject job is the copy job, the pausing operation is carried out (S37 and S38, FIG. 4). When the subject job is the document job, the job is stopped (S39 and S40, FIG. 4). When the subject job is the network transmission, no action is carried out (S41 and S42, FIG. 4). When the subject job is the network reception, the job is brought into the pausing state (S43 and S44, FIG. 4).

When the above-explained process operations as to all of the jobs are completed, a further process operation with respect to the pausing job is carried out (S45).

Figure 6C:
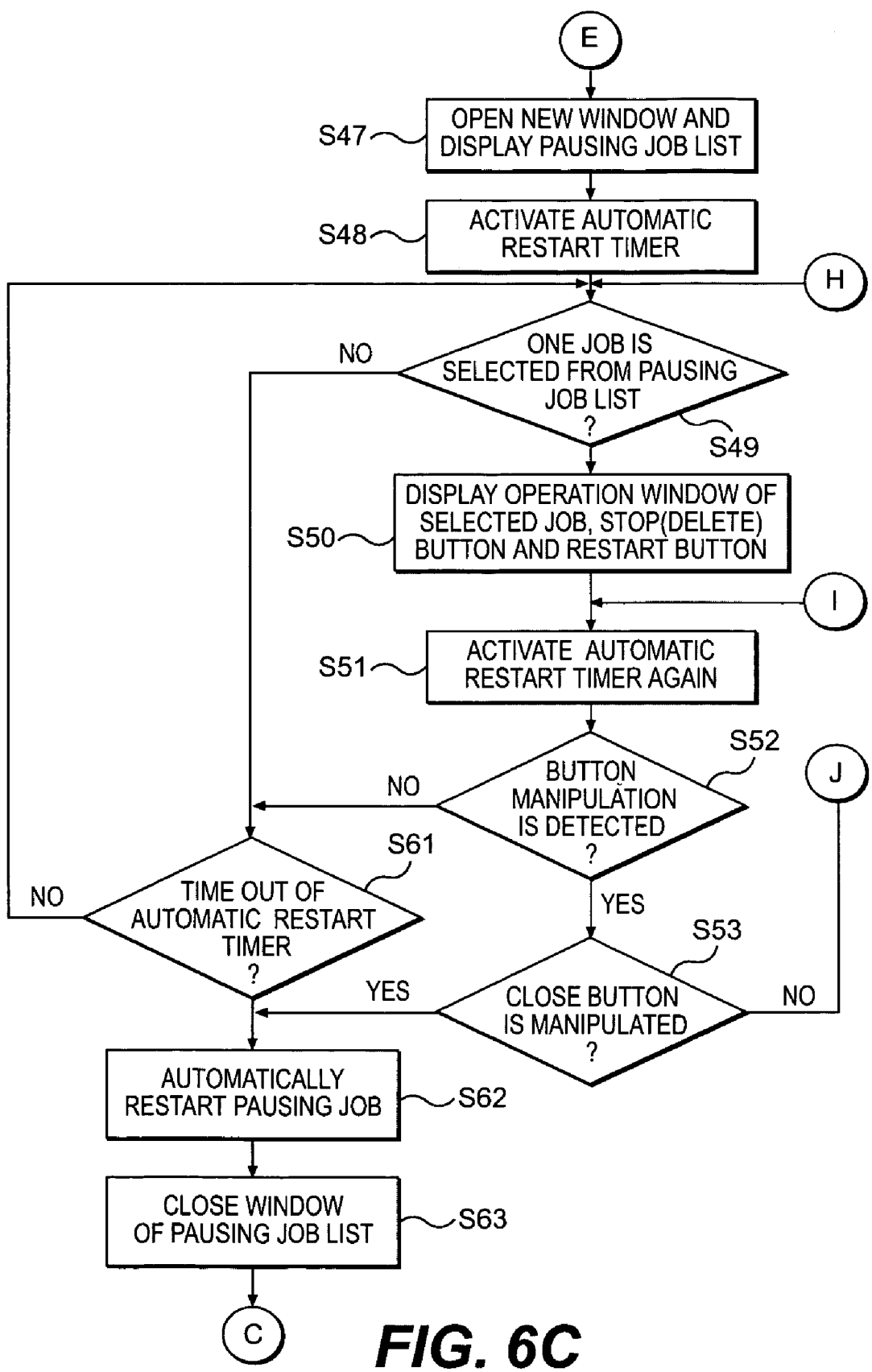
Figure 6D:
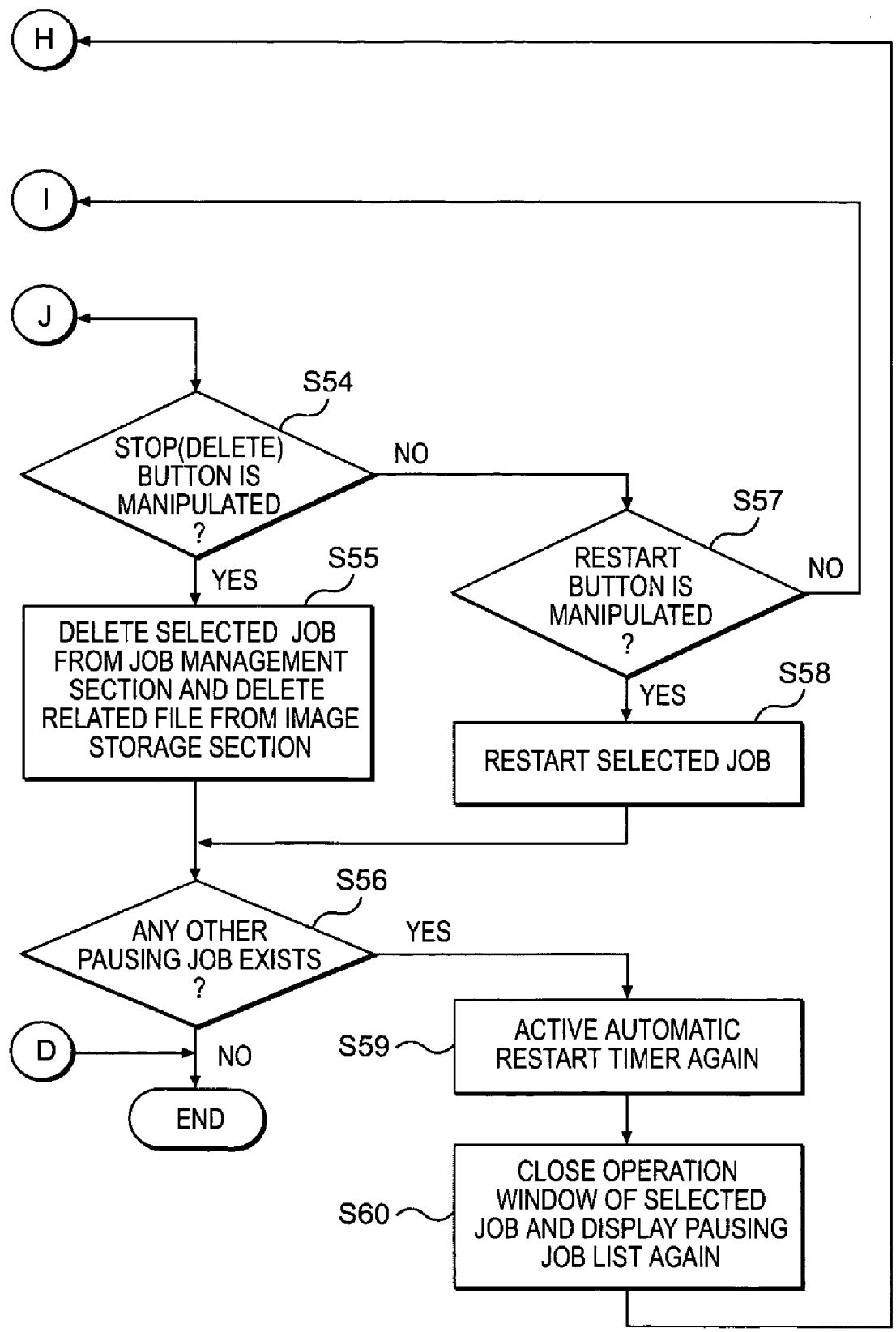

Referring now to FIGS. 6C and 6D, a description will be made of operations executed when a job is made to pause. In FIGS. 6C and 6D, a new window is first opened to display a list (FIG. 8A) of pausing jobs (S47). Then, an automatic restarting timer is initiated (S48). This automatic restarting timer can prevent leaving the job in a paused condition. When a job is selected from the list, an operating window of this job is displayed. For example, if the "network reception" shown in FIG. 8A is selected, an operation window of the "network reception" is displayed as shown in FIG. 8B. Within this window, a "stop (delete)" button and a "restart" button are provided by which a user may select process operations corresponding thereto (S49 and S50). Then, at this time, the automatic restarting timer is again initiated (S51).

Thereafter, when the "stop (delete)" button is manipulated (S52, S53, S54), the job under selection is stopped. In other words, the job is deleted from the job management section, and the related file is deleted from the image storage section (S55).

Also, when the "restart" button is manipulated, the job under selection is restarted (S57 and S58).

After the above-described process operations of stopping and restarting the job have been carried out, the CPU judges as to whether or not a pausing job is still left in the list of the pausing job. When no pausing job is left, the process operation is accomplished (S56). Conversely, if a pausing job is still left, the automatic restarting timer is again initiated. Thereafter, the operating window of the job whose process operation is ended is closed and the list of the pausing job is displayed as shown in FIG. 6C (S56, S59, and S60). Then, the process operation is returned to the previous step S49.

On the other hand, in the event the "close" button is manipulated at step S53, all of the jobs brought into the pausing state are again started and the window for the list of the pausing jobs is closed (S62 and S63). Also, when the key is not manipulated and thus the automatic restarting timer times up, the process operation is advanced to step S63 in which the job brought into the pausing state is restarted and the window for this list is closed (S61, S62, and S63).

Again, FIG. 8A indicates a condition in which the stop key is depressed to bring three jobs (copy, document storage, and net reception jobs) to the pausing state. Such a job, which has been set to be stopped, is being stopped at this stage. Also, another job to which "no action" is set is still executed continuously.

In FIG. 8A, the user may select the job of "net reception". As a consequence, as indicated in FIG. 8B, the operation window of "net reception" is displayed. In this case, the user selects either "restart" or "stop (delete)" so as to execute an operation corresponding to the job of the "net reception". In this manner, the job of "net reception" is derived from the pausing state. Then, the remaining jobs of "copy" and "document storage" are displayed on the window for the list of pausing jobs.

Thus, the description of the operations of the embodiment are accomplished. It should also be noted that the present invention is not limited to the above-described embodiments, but may be modified and changed without departing from the scope and spirit of the present invention. Next, modifications of the preferred embodiment will now be explained.

Figure 9:
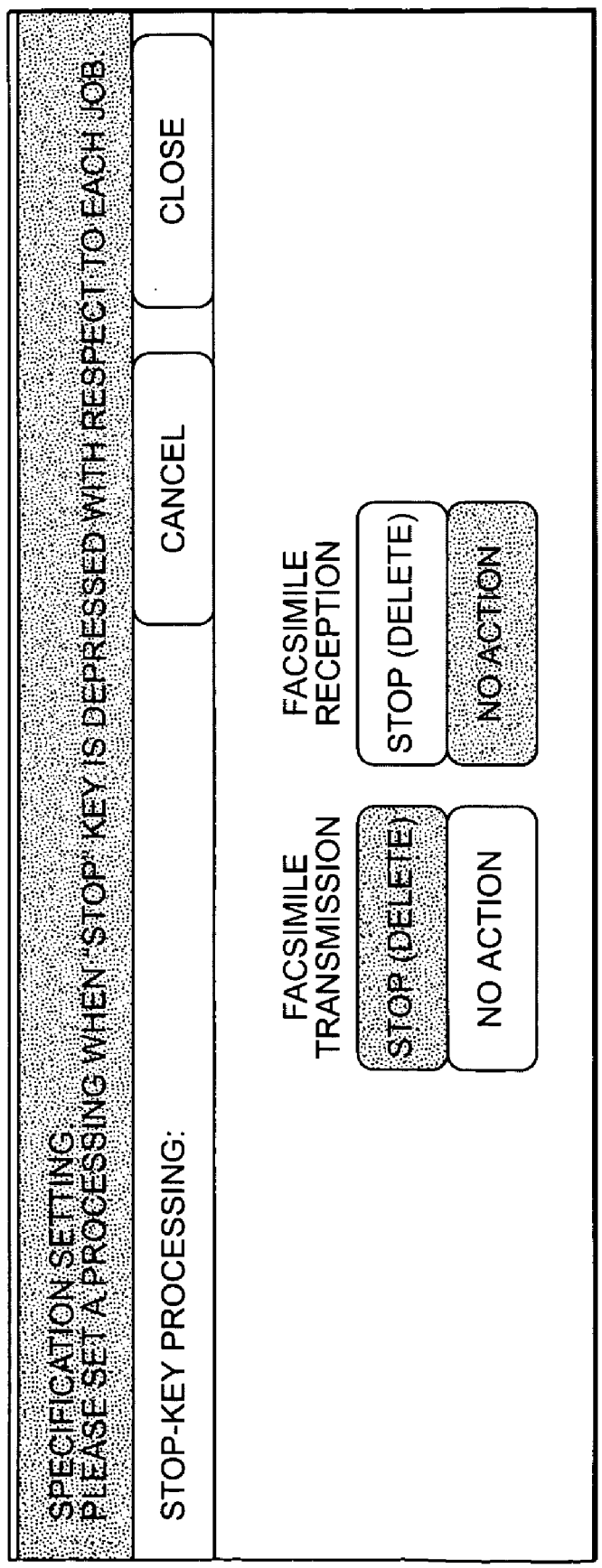
FIGS. 9 to 13E are diagrams for explaining modifications of the embodiment.

FIG. 9 illustrates a setting operation of a facsimile job when a stop-key is depressed. In this example, the facsimile job is set independent from the setting of other job kinds. As to the facsimile job, an option of "pausing" is not set, because the pausing operation of the facsimile job is equal to the stopping operation thereof.

Figure 10:
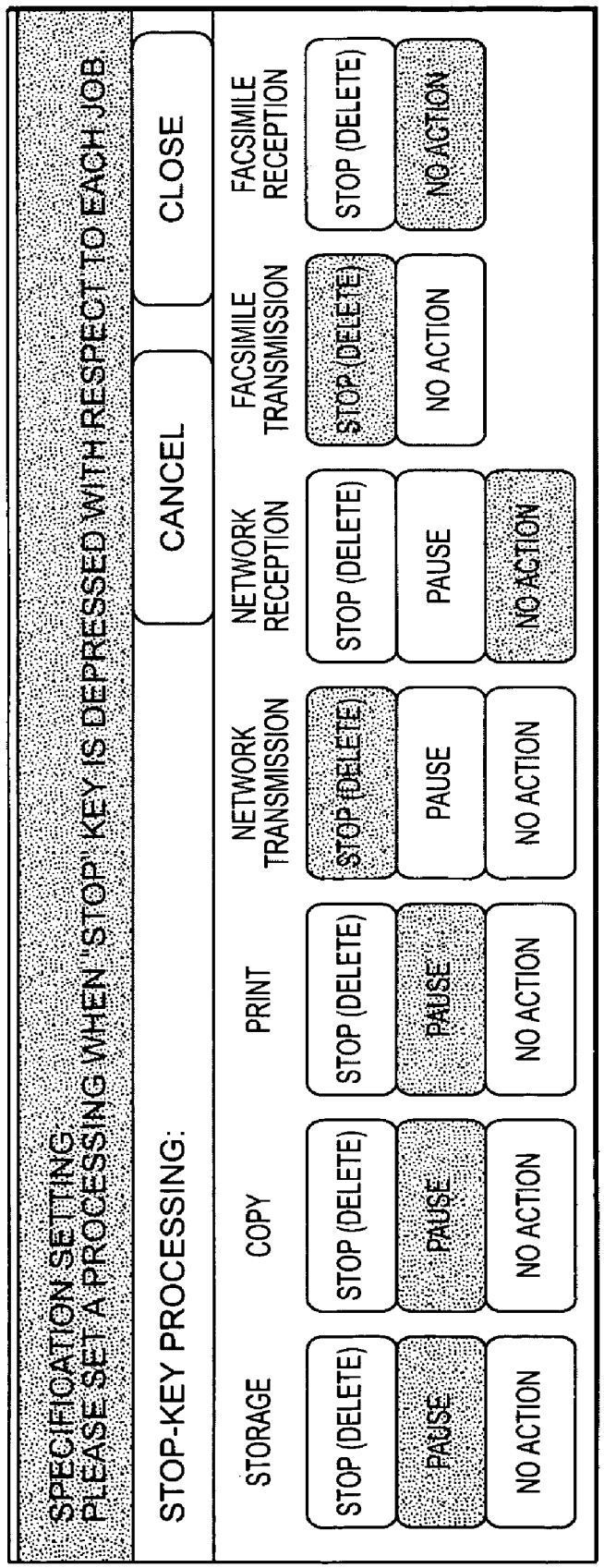

FIG. 10 represents a modification wherein the setting operation of the facsimile job can be carried out on the same screen where the setting operations of other jobs are performed.

Figure 11:
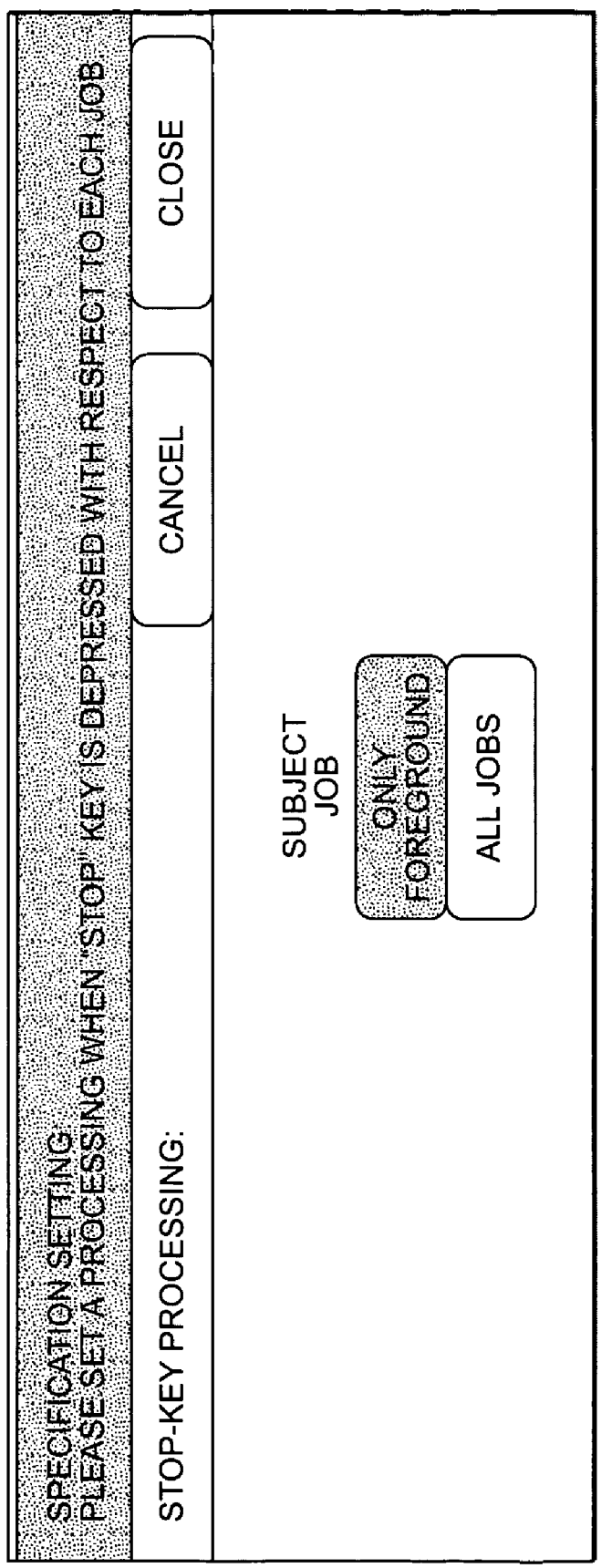

FIG. 11 represents a modification wherein a range to which the setting of stop-key processing is applied can be defined. In other words, the application range can be varied by such a fact as to whether or not a job corresponds to a foreground. In this case, a job of a foreground corresponds to a job whose execution condition is displayed on the liquid crystal display 50. It can be understood that the foreground job is a job most closely related to the user who directly manipulates the necessary operation in the front of the document processing apparatus 10. In FIG. 11, when the user instructs "only foreground", only the process operation for the foreground is made to pause, and directly continued in accordance with the content of the setting storage table for stop-key processing. When the user selects "all jobs", the background job is similarly processed in accordance with the content of the setting storage table for stop-key processing. When the user situated in front of the document processing apparatus is highly emphasized, "all jobs" would be selected. In this case, the pausing job of the background may be selectively carried out as the stopping operation or the restarting operation. Conversely, when the user located removed from the document processing apparatus is highly emphasized, the "only foreground" may be selected. In this case, even when the user situated in front of the document processing apparatus depresses the stop key, the job of the background cannot be controlled.

Figure 12:
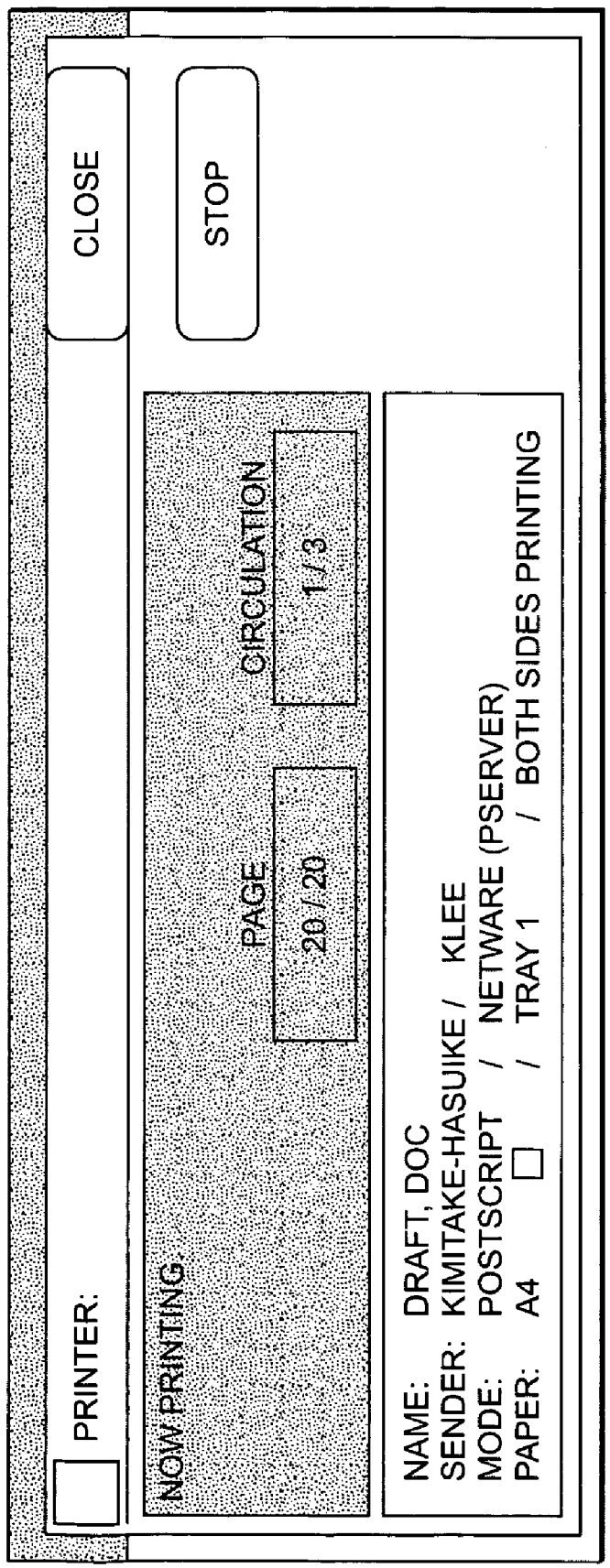

FIG. 12 indicates such a display condition that, while a state of a job under execution is displayed on the liquid crystal display 50, a key used to stop this job execution is displayed on the liquid crystal display 50. In this case, the job whose execution state is indicated is the foreground job which is a job most closely related to the user situated in front of the document processing apparatus 10. Thus, the user can intuitively understand that the stop key is related to the job of this foreground. As a result, while the user manipulates this key, the user can stop the job of the foreground in the user-friendly manner.

Figure 13A:
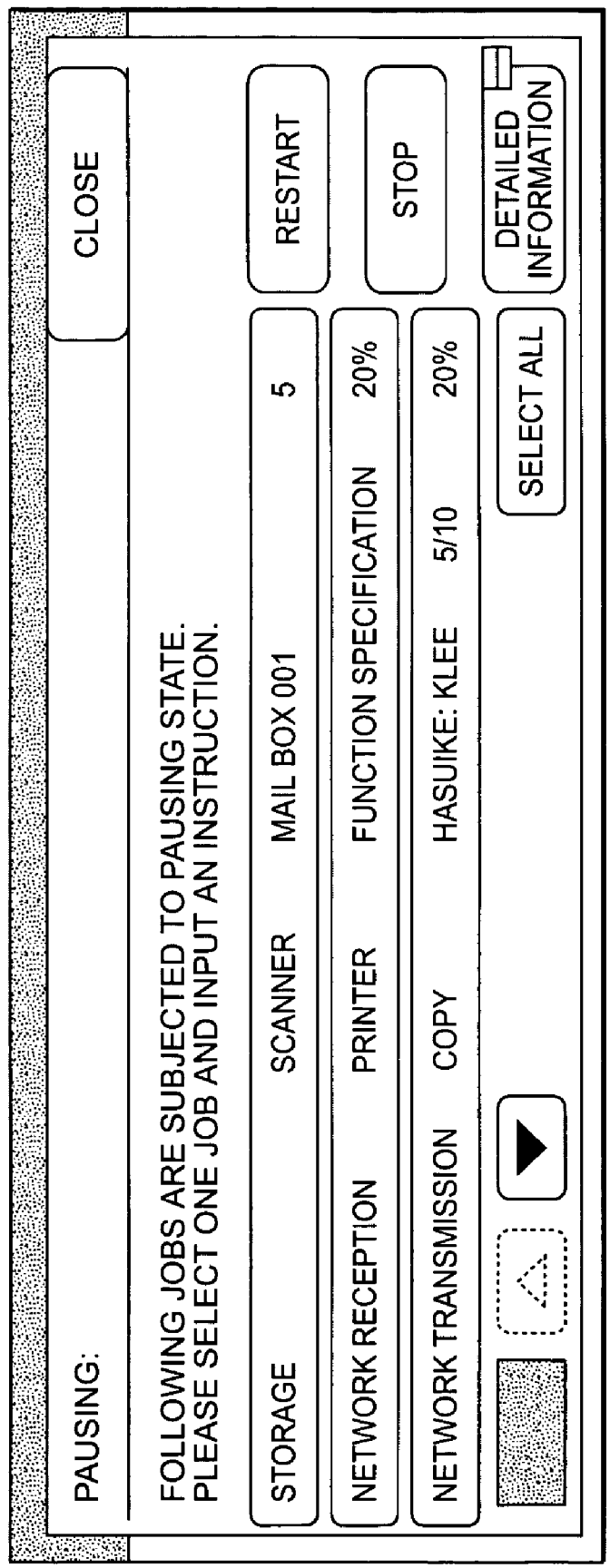
Figure 13B:
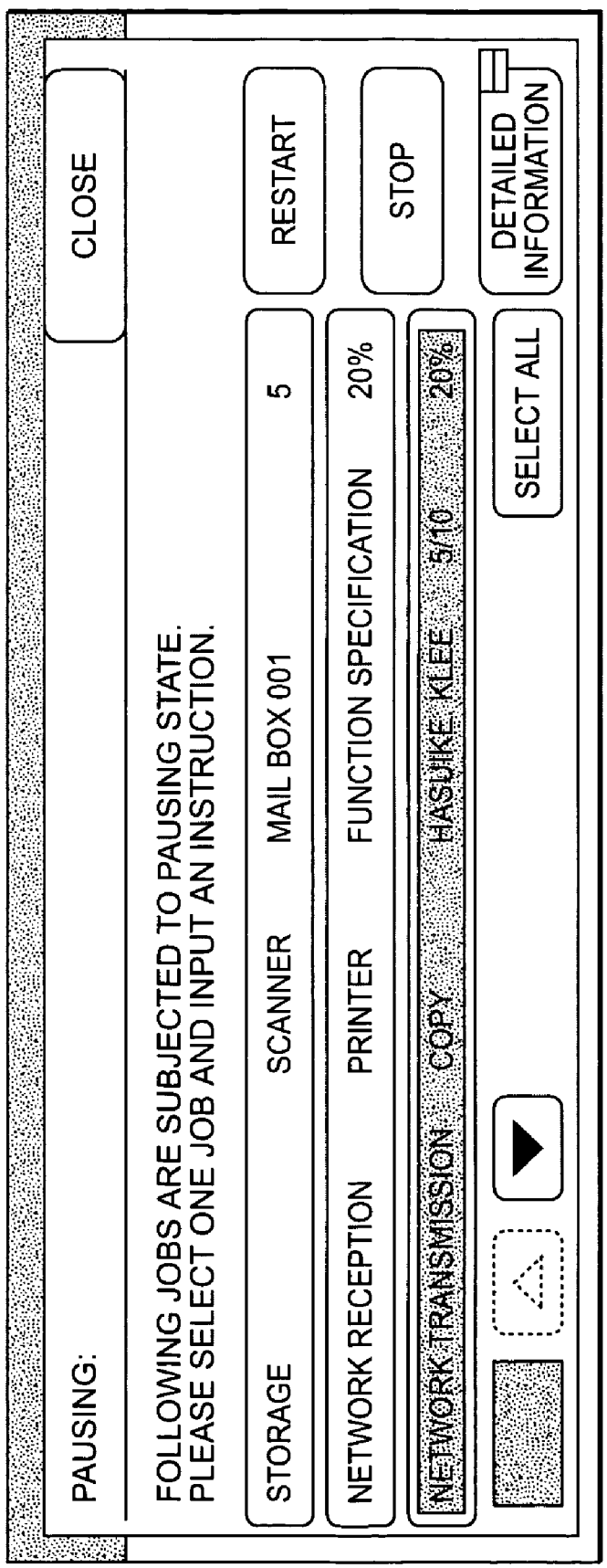
Figure 13C:
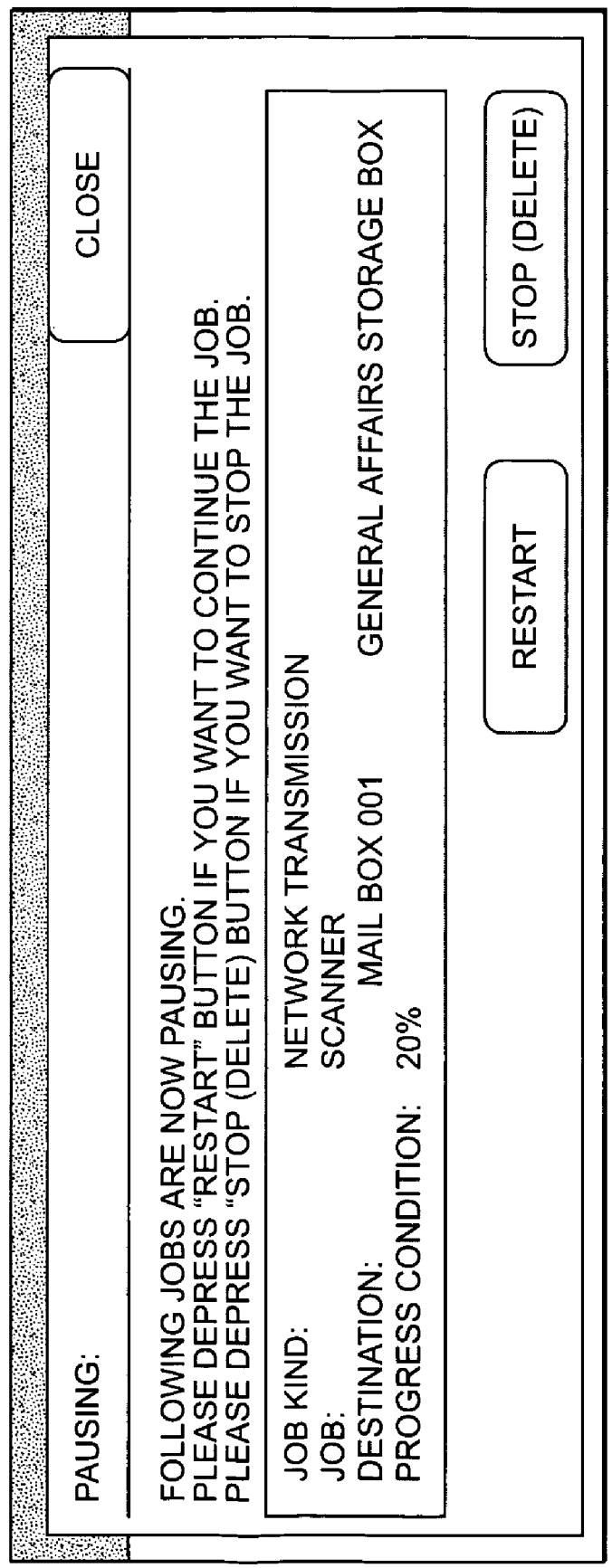
Figure 13D:
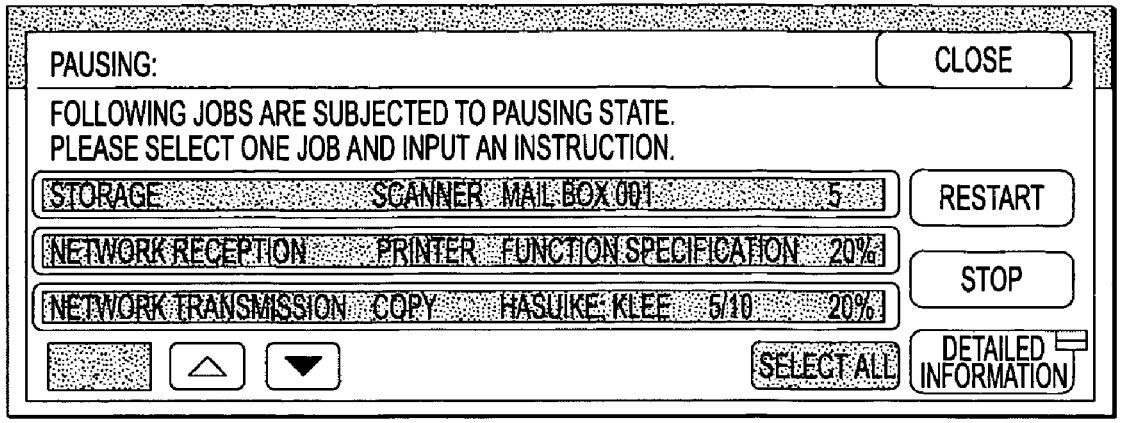
Figure 13E:
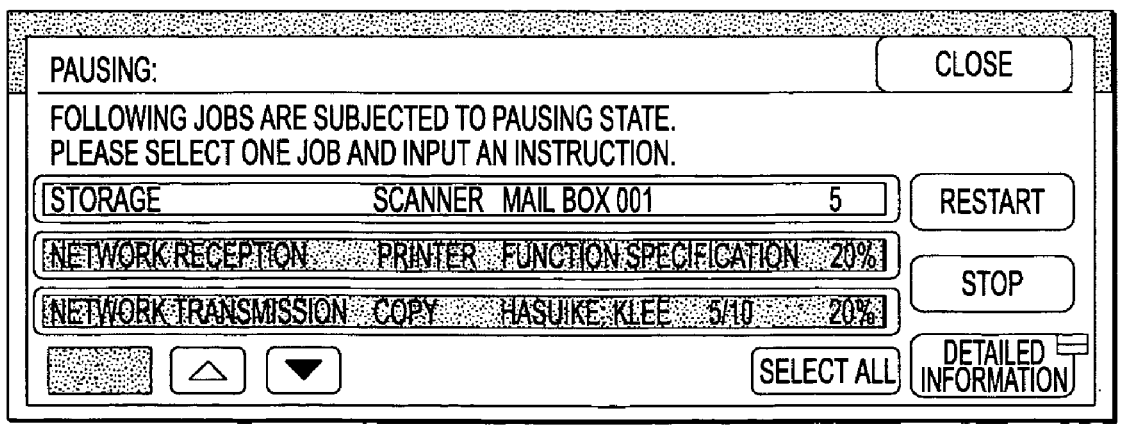

FIGS. 13A to 13E represent such display conditions that while the user may select all of the jobs in the list of the pausing jobs by way of the "select all" buttons, the user may collectively execute the restarting operation and the stopping operation. In FIG. 13B, the restarting operation and the stopping operation are separate steps similar to those as explained with reference to FIGS. 8A to 8C. In this condition, if a "detailed information" button is manipulated by the user, detailed information of the subject job is displayed as shown in FIG. 13C. As shown in FIG. 13D, while the "select all" button is manipulated, both the restarting operation and the stopping operation can be carried out with respect to all of the jobs in batch. Alternatively, after the "select all" button is manipulated, certain jobs can be individually selected to cancel the selection and the remaining jobs may be restarted, or stopped in batch as shown in FIG. 13E.

As previously described, according to the present invention, since the condition of the pausing job is designated in response to a predetermined event, it is possible to avoid unnecessary job pauses and therefore the throughput would be lowered. Also, the stopping process operation can be quickly carried out.

What is claimed is:

1. A job execution control apparatus, comprising:
   an execution section that executes a plurality of jobs in a parallel manner;
   a setting section that allows a user to set a pause condition for each job kind and a stop condition for each job kind;
   a storage section that stores the pause condition set by the setting section;
   a controller, wherein when a button is depressed, the controller makes a first job, which is being executed by the execution section and satisfies the pause condition, pause and stop and delete a second job, which is being executed by the execution section and satisfies the stop condition;
   a display that displays the pausing jobs made to pause by the controller; and
   a specifying section that specifies at least one job among the pausing jobs displayed on the display.

2. The job execution control apparatus as set forth in claim 1, further comprising a stopping section that stops the specified job.

3. The job execution control apparatus as set forth in claim 1, further comprising a restarting section that restarts the specified job.

4. The job execution control apparatus as set forth in claim 1, wherein the setting section allows the user to set a parameter of a job as the pause condition.

5. The job execution control apparatus as set forth in claim 1, wherein the display displays only the pausing job.

6. The job execution control apparatus as set forth in claim 1, wherein the display displays jobs other than the pausing job.

7. The job execution control apparatus as set forth in claim 1, wherein the setting section further allows the user to set an additional condition under which the job pauses in addition to the pause condition.

8. The job execution control apparatus as set forth in claim 7, wherein the additional condition is defined by such a fact as to whether the job corresponds to a background job, or a foreground job.

9. A job execution control apparatus according to claim 1, wherein the predetermined event is an operation of a predetermined key provided on a portion except for the display.

10. A job execution control apparatus according to claim 1, wherein the storage section further stores an attribute of a job which is directed to a pausing job.

11. A job execution control apparatus according to claim 1, further comprising:
    a notifying section that notifies at least an identifier of the pausing job to an instruction apparatus; and
    stopping section that stops and deletes at least one job instructed by the instruction apparatus among the pausing jobs.

12. A job execution control apparatus according to claim 1, wherein the display is provided with a touch panel function for displaying information related to one job that is being executed.

13. A job execution control apparatus in accordance with claim 1, wherein said predetermined event includes an instruction input operation of a user.

14. A document processing job execution control apparatus, comprising:
- an execution section that executes a plurality of document processing jobs including a copy job, a print job, and a facsimile job in a parallel manner;
- a setting section that allows a user to set a pause condition for each job kind and a stop condition for each job kind except for a facsimile job;
- a storage section that stores the pause condition set by the setting section;
- a controller, wherein when a button is depressed, the controller makes a first job, which is being executed by the execution section and satisfies the pause condition, pause and stop and delete a second job, which is being executed by the execution section and satisfies the stop condition;
- a display that displays the pausing jobs made to pause by the controller;
- a specifying section that specifies at least one job among the pausing jobs displayed on the display, and
- a stop section that stops and deletes the specified job specified by the specifying section.

15. A document processing job execution control apparatus according to claim 14, wherein the storage section further stores an attribute of a job which is directed to a pausing job.

16. A document processing job execution control apparatus in accordance with claim 14, wherein said predetermined event includes an instruction input operation of a user.

17. A document processing job execution control apparatus comprising:
- a plurality of document processing jobs including a copy job, a print job, and a facsimile job in a parallel manner;
- a setting section that allows a user to set a pause condition for each job kind and a stop condition for each job kind except for a facsimile job;
- a storage section that stores a first condition satisfied by a job which is stopped and deleted without any restriction in response to a predetermined event and a second condition satisfied by a job which pauses in response to the predetermined event;
- a stop section that stops and deletes the job satisfying the first condition in response to the predetermined event;
- a pause section that makes a job, which is being executed by the execution section and satisfies the second condition pause in response to the predetermined event;
- a display that displays the pausing jobs made to pause by the pausing section; and
- a specifying section that specifies at least one job among the pausing jobs displayed on the display, wherein the stop section stops and deletes the job specified by the specifying section.

18. A document processing job execution control apparatus in accordance with claim 17, wherein said predetermined event includes an instruction input operation of a user.

* * * * *